Figure 1:
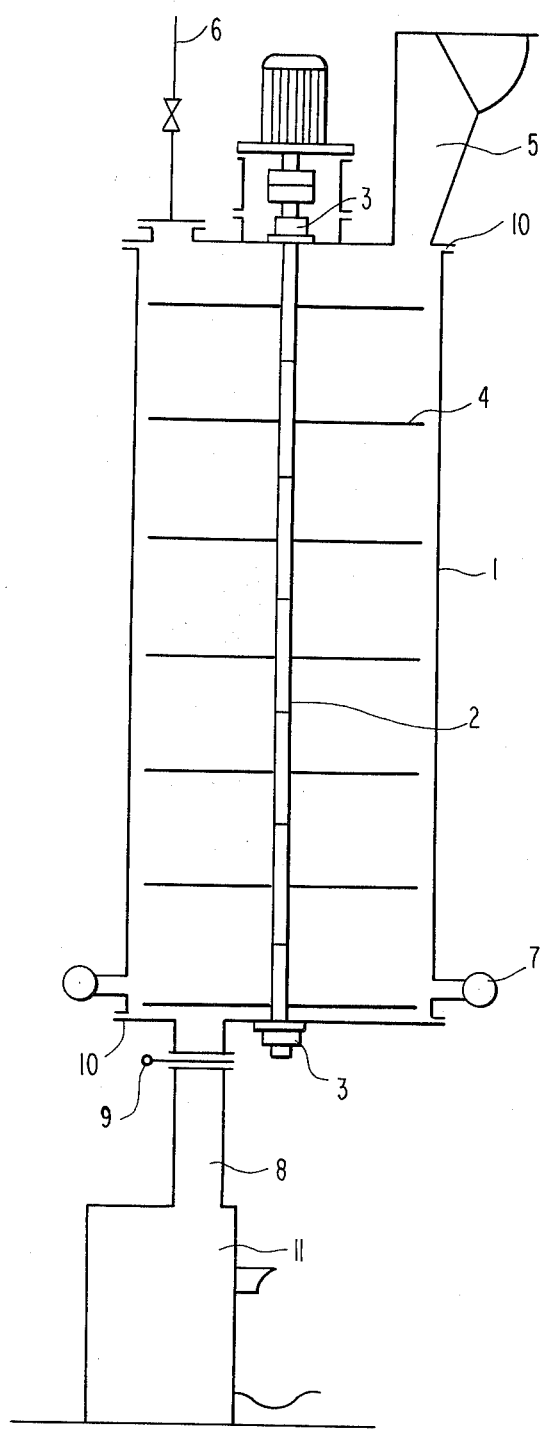

United States Patent [19]

Rothbühr

[11] 4,435,377

[45] Mar. 6, 1984

[54] OXIDATIVE AFTER-TREATMENT OF CARBON BLACK

[75] Inventor: Lothar Rothbühr, Hürth, Fed. Rep. of Germany

[73] Assignee: Degussa Aktiengesellschaft, Frankfurt am Main, Fed. Rep. of Germany

[21] Appl. No.: 433,072

[22] Filed: Oct. 6, 1982

Related U.S. Application Data

[63] Continuation of Ser. No. 313,028, Oct. 19, 1981, abandoned.

[30] Foreign Application Priority Data

Nov. 30, 1980 [DE] Fed. Rep. of Germany ....... 3041188

[51] Int. Cl.$^3$ .......................... C09C 1/56; C09C 1/48; C01B 31/02
[52] U.S. Cl. .................... 423/460; 423/449; 423/461; 106/307
[58] Field of Search ...................... 423/449, 460, 461; 106/307

[56] References Cited

U.S. PATENT DOCUMENTS

| Re. 19,664 | 8/1935 | Damar | 423/449 |
|---|---|---|---|
| 2,457,962 | 1/1949 | Wheley | 422/150 |
| 2,682,448 | 6/1954 | Cines | 423/460 |
| 2,799,358 | 7/1957 | Bradley | 422/150 |
| 3,247,003 | 4/1966 | Pollock | 423/460 |
| 3,676,365 | 7/1972 | Shirai et al. | 422/225 |
| 4,010,001 | 3/1977 | Dollinger | 422/150 |

FOREIGN PATENT DOCUMENTS

895991  5/1962  United Kingdom ............... 422/150

*Primary Examiner*—Gregory A. Heller
*Attorney, Agent, or Firm*—Beveridge, DeGrandi & Kline

[57] ABSTRACT

The invention relates to a process for after-oxidation of carbon black powder with oxidants which are gaseous or are dispersed in the gas phase. A closed vertical cylinder is provided at its top with a carbon black input opening and a vent duct and at its bottom with feed ducts for oxidant or flushing air. A stirrer shaft runs along its central axis; stirrer arms are fitted to it at intervals over the height of the cylinder and offset with respect to each other, and sweep over the whole cylinder cross section in predominantly horizontal setting.

9 Claims, 2 Drawing Figures

OXIDATIVE AFTER-TREATMENT OF CARBON BLACK

This is a continuation of my copending application Ser. No. 313,028 filed Oct. 19, 1981, now abandoned, which is relied on and incorporated herein by reference.

The invention relates to an apparatus for after-treatment of powdery carbon black with gaseous, vaporous or aerosol-like oxidants. Carbon black is the most important industrially-produced black pigment. It is utilized both as a reinforcer in elastomers and also as a pigmentary black pigment in many systems. Here the plastics are particularly to be mentioned, in the broadest sense lacquers and paints, printing inks, and also utilization in cement mixtures, paper and cardboard. While normal gas carbon blacks or furnace carbon blacks are preferably utilized in plastics, the relationships in lacquer systems and printing ink systems are more difficult. This is because the binders for lacquers and printing inks frequently have a polar character. The carbon black, per se non-polar, does not fit well into these polar binder media. Non-polar carbon blacks disperse relatively poorly in polar binder media.

In order to overcome these difficulties, normal carbon black has been subjected to an oxidative after-treatment and the per se non-polar surface has been converted into a partially polar surface.

A known process for the oxidation of carbon black is described in German published application No. 1,592,840. Here nitric acid or oxides of nitrogen are continuously sprayed into a stream of carbon black in a horizontal rotating tube and then the excess acids are removed again in a second zone by passing air across. This method is suitable for the oxidation of bead-form carbon black. When non-beaded carbon black is used here, the carbon black agglomerates on rotation of the tube. In any case it would be densified. This is a great disadvantage when easily dispersible after-oxidized powdery carbon black is to be produced. This process is not very suitable for this purpose. A further disadvantage resides in that the oxidant, insofar as it is located in the gas stream, sweeps away over the carbon black lying on the floor of the tube and thus has little intimate contact with the carbon black. Even the addition of turning blades and the like cannot lead to ideal contact. Also, the tube can be only partially filled with carbon black.

The process according to German Pat. No. 1,196,808, on the other hand, operates with air as oxidant and nitrogen oxide as catalyst, air being the oxidant and the mechanical carrier for the carbon black. Oxidation temperatures of 150°–230° C. are utilized.

A mode of operation is sought which achieves as low as possible a total oxidation but produces a very thin, uniform oxidation skin distributed over the surface. This objective cannot be achieved with the process of German Pat. No. 1,196,808, in which too strong an oxidation occurs, since the surface of the carbon black is not covered without residue, but pores arise.

A pore-free oxidation skin can only arise in an atmosphere of pure oxidant and at a low oxidation temperature.

An objective was therefore to develop an apparatus which permits a very intimate contact of carbon black with an oxidation at oxidation temperatures below 150° C., requires no carrier medium such as air and, in spite of the intimate contact of the solid carbon black with the gaseous or vaporous oxidant, effects no compression or agglomeration of the carbon black. This apparatus is also to remain fully effective with extreme carbon black qualities which have a strong adhesive action because of low structure. A further objective was to develop an apparatus which can be filled with the carbon black not merely to a small extent but completely and thus ensures a good effectiveness.

These problems are solved by an apparatus for after-treatment of powdery carbon black with oxidants which are in gaseous, vaporous or aerosol form, characterized by a closed vertical cylinder provided on its cover plate with a carbon black input opening and a vent duct and at its floor plate with a carbon black outlet opening and at least one feed duct for oxidant or flushing air, and a shaft arranged in the mid-axis of the cylinder, gas-tightly mounted or passed in or out at the cover and floor plates, and slowly rotatable by means of a drive, with stirrer arms arranged at intervals over the cylinder height and mutually offset, with the total cross section of the cylinder being swept by them in the predominantly horizontal setting.

The feed duct for oxidant or flushing air can here be divided into several, preferably 4–6 individual pipes which end tangentially at the lowest part of the vertical cylinder.

It has been found to be advantageous for the ratio of the height of the cylinder to the diameter of the cylinder to range between 2:1–5:1, preferably between 3:1 and 4:1.

An embodiment proved in practical operation envisages provision of 8–16 levels in the cylinder with stirrer arms; the successive stages can be mutually offset by 45°–90°.

A design of the apparatus according to the invention has further been found to be of particular advantage in which the speed at the tips of the stirrer arms range between 0.2 and 2 m/sec preferably between 0.5 and 1 m/sec.

Figure 2:
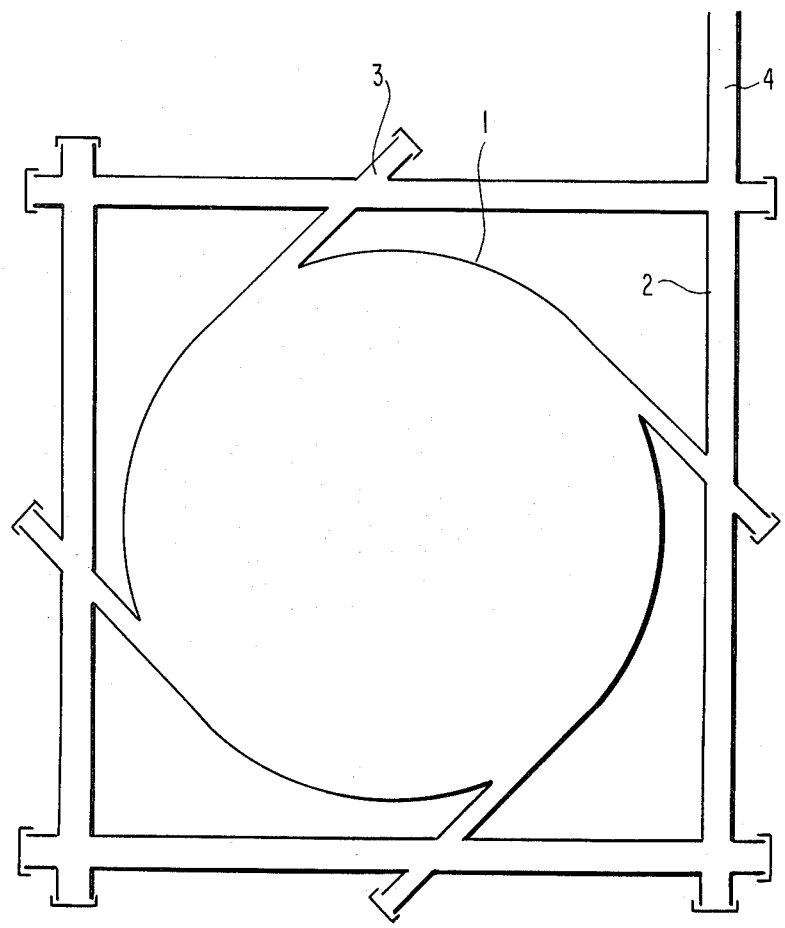

The apparatus according to the invention is further explained below with reference to the attached drawing. In the drawing, there are shown:

FIG. 1—A vertical section through an embodiment of the apparatus according to the invention; and FIG. 2—a horizontal section through an apparatus according to the invention with a preferred type of feed duct for the oxidant.

According to FIG. 1, the apparatus consists of an upright, closed cylinder 1, which possesses, respectively, an upper and a lower cover plate 10. Built centrally into the cover plates are respective upper and lower bearings 3, through which projects a shaft 2 passed through the entire length of the cylinder. Stirrer arms 4, which are mutually offset, are fastened at intervals to this central shaft. Furthermore, the cylinder possesses a filling opening for carbon black 5 and also an outlet opening for carbon black 8 which can be closed by a slide valve 9. The finished carbon black can be packed through the bagging device 11. The exhaust duct 6 serves for takeoff of excess gases. The oxidant, and later the blow-out air, is introduced through the feed ducts 7 into the cylinder.

The preferred form of the feed duct for oxidant is shown in more detail in FIG. 2. The oxidant comes from the direction 4 and fills the distributor 2, which extends around the cylinder 1. Starting from the distributor, the oxidant is then introduced tangentially through the small tube 3 into the lowest region of the cylinder.

Operation with the apparatus according to the invention is carried out substantially as follows:

Powdery carbon black is filled into the stationary cylinder, with the shaft already running, through the filling opening 5. Filling is continued until about 85% of the volume is filled. The remaining 15% of the volume is considered as safety volume which is thought necessary for the oxidation reaction. Gaseous, vaporous or aserosol-form oxidant is now fed in through the feed duct 7, and compresses the air present in the upright cylinder. The addition of oxidant is continued for a desired time. Preferably the oxidation times proper are limited to 2–6 hours. On addition of the oxidant, the temperature rises to 110°–150° C. Flushing air is then compressed through the feed duct 7 into the upright cylinder, to displace the oxidant. After the desired freedom from oxidant has been reached (preferably, freedom from acid residues), the addition of flushing air can be terminated and the finished, oxidized carbon black can be let out and packaged through the outlet opening 8. During the whole oxidant addition and flushing air addition, the shaft of the vertical cylinder, with the stirrer arms attached to it, moves at a speed which keeps the carbon black in motion, in fact like a liquid, but causes no compression or agglomeration. The gases displaced from the container can be led off through the duct 6.

The mode of operation with the apparatus according to the invention is to be illustrated by means of several examples, without the examples constituting any limitation of the concept of the invention.

EXAMPLE 1

An upright cylinder with a diameter of 1,400 mm and a height of 4,500 mm possesses a cover plate and a floor plate. Bearings are built on the cover plate and also on the floor plate, and carry a central shaft in the cylinder. The shaft, in turn, carries 11 pairs of stirrer arms, which are mutually offset at the individual levels by 90°. The horizontal extent of the stirrer arms reaches practically up to the wall; only as much space is left as is necessary for no wall contact to occur. The shaft is set in motion in the cylinder at a speed of 6 r.p.m. by a motor at the head of the shaft.

With the stirrer arms revolving, an amount of 1,200 kg of powdery carbon black is fed into the cylinder through a filling opening arranged on the cover plate. The carbon black has the following properties:

| Iodine adsorption | by DIN 53,582 | 119 mg/g |
|---|---|---|
| DBP absorption | by DIN 53,601 | 47 ml/100 g |
| Color density in comparison with IRB 3 | by DIN 53,234 | 116% |
| Volatile components per 1 g | by DIN 53,522 | 1% |
| pH value | by DIN 53,200 | 10 |
| Acidity | | 0 ml N/10 KOH per 100 g carbon black |
| Bulk density | by DIN 53,194 | 240 g/l |

Because of its lower structure (DBP-number), the carbon black is heavy and adhesive.

The cylindrical container is provided in the lowest region with a supply device which surrounds it externally and from which 4 small pipes lead tangentially into the interior of the container. Nitrogen dioxide is now added from this device at 10 kg/h for three hours. The temperature thereupon rises to 120° C. The displaced gases are able to escape through an exhaust gas duct on the cover plate of the container. After the three-hour oxidation time, blowing out of the excess oxidant begins. Air is blown for this purpose with the device described above with 4 tangential pipes at 7 Nm$^3$/h. After 20 hours, this process is terminated and the carbon black is cooled to 25° C. The carbon black is now let out through an outlet duct on the floor plate of the container and packed. It has the following properties:

| Iodine Adsorption | by DIN 53,582 | 101 mg/g |
|---|---|---|
| DBP absorption | by DIN 53,601 | 45 ml/100 g |
| Color depth in comparison with IRB 3 | by DIN 53,234 | 122% |
| Volatile components per 1 g weight | by DIN 53,522 | 5% |
| pH value | by DIN 53,200 | 4.8 |
| Acidity | | 2.0 ml N/10 KOH per 100 g carbon black |
| Bulk density | by DIN 53,194 | 220 g/l |

The oxidation of the carbon black surface is to be recognized from the rise in color density, the volatile components, and the acidity, and a fall in the pH value. For the surprisingly favorable operation of the apparatus according to the invention, the fact can be cited that in spite of the adhesive, easily agglomerating starting product, the finished product has a lower bulk density than the starting material.

EXAMPLE 2

A shaft mounted top and bottom in a cylinder having a diameter of 400 mm and a height of 1,000 mm is driven at a speed of 10 rpm. Seven double stirrer arms are fastened to the shaft and are mutually offset at the individual levels by 45°. With the stirrer arms running, an amount of 10 kg of a powdery carbon black with the following properties is added from the cover of the cylinder:

| Iodine adsorption | 180 mg/g |
|---|---|
| DBP absorption | 44 ml/100 g |
| Color depth cf. IRB 3 | 119% |
| Volatile components | 1.5% |
| pH value | 9.5 |
| Acidity | 0 ml N/10 KOH per 100 g carbon black |
| Bulk density | 210 g/l |

The cylindrical container is now supplied for a period of two hours with 0.5 kg NO$_2$/h, blown in via 2 tangentially arranged pipes in the neighborhood of the floor plate. The reaction temperature then rises to 145° C. After the two hours, the oxidation process is concluded, and the excess oxidant is now displaced by blowing in 3 Nm$^3$/h of air for a period of 5 hours. At the end of this process, the oxidized carbon black is let out by opening a slide valve at the floor of the container. The carbon black thus obtained has the following properties:

| Iodine adsorption | 115 mg/g |
|---|---|
| DBP absorption | 42 ml/100 g |
| Color density cf. IRB 3 | 125% |
| Volatile components | 7.5% |
| pH value | 4.5 |

| | -continued |
|---|---|
| Acidity | 6.2 ml N/10 KOH per 100 g carbon black |
| Bulk density | 180 g/l |

The oxidative alteration of the surface of the carbon black can also be easily seen from this example, by comparison of the carbon black qualities used and obtained. This carbon black is likewise to be characterized as a carbon black which adheres strongly and easily tends to densify.

In spite of this, it can be taken out of the apparatus according to the invention with a bulk density which is lower than that of the starting material, and this without risk. On the other hand, in other known apparatuses for carbon black oxidation spark or fire formation can occur with strongly adhesive carbon blacks, even upon removal of the finished, oxidized carbon black, since the oxidant cannot be sufficiently removed from it. Such dangers are completely excluded by the apparatus according to the invention.

I claim:

1. A process for the after-treatment of powdery carbon black with an oxidation agent which is gaseous, vaporous or aerosol-like in order to convert carbon black with a non-polar surface into carbon black which has a polar surface and thereby to improve the compatibility of the carbon black with polar binders for lacquers and printing inks, comprising introducing the powdery carbon black into a reaction zone, said reaction zone having an upper and a lower portion, introducing into the lower reaction zone an oxidation agent whereby said oxidation agent flows from the lowest part of the reaction zone up through the carbon black in said reaction zone, continuously agitating said carbon black in said reaction zone, said reaction zone being a vertical, cylindrical reactor, containing a shaft in the middle axis of said reactor, said shaft being equipped with stirrer arms brushing the entire cylinder cross section in an overwhelmingly horizontal position, said arms being displaced in the manner of tiers over the height of the reactor and rotating with a speed such that the stirrer arm points move between 0.2 and 2.0 m/sec, whereby the volume of the oxidation agent stream is dimensioned so that the reaction temperature in the reactor remains below about 150° C., after the carbon black reaches the desired degree of oxidation, removing the surplus of oxidation agent by flushing air while maintaining the above-mentioned stirring movement and recovering the treated carbon black product in a powdery form without compression or agglomeration of the carbon black.

2. The process as in claim 1, wherein the oxidation agent or the flushing air is divided into several individual streams which discharge tangentially in the lowest part of the reactor.

3. The process as in claim 1, wherein the ratio between the height of the reactor and the diameter of the reactor lies between 2:1 to 5:1.

4. The process as in claim 1, wherein the ratio between the height of the reactor and the diameter of the reactor lies between 3:1 and 4:1.

5. The process as in claim 1, wherein 8–16 tiers with stirrer arms are attached in the reactor.

6. The process as in claim 5, wherein the successive tiers are mutually displaced by 45°–90°.

7. The process as in claim 1, wherein the speed at the point of the stirrer arms lies between 0.5 and 1.0 m/sec.

8. The process as in claim 1, wherein the carbon black is introduced into the reactor to the extent of up to 75% of reactor volume.

9. The process as in claim 1, wherein the reaction time is from 2 to 6 hours oxidation time during which the temperature is permitted to rise to about 110° to 150° C.

* * * * *